US011216594B2

United States Patent
(12) United States Patent
Ghosh et al.

(10) Patent No.: US 11,216,594 B2
(45) Date of Patent: Jan. 4, 2022

(54) COUNTERMEASURES AGAINST HARDWARE SIDE-CHANNEL ATTACKS ON CRYPTOGRAPHIC OPERATIONS

(71) Applicant: Intel Corporation, Santa Clara, CA (US)

(72) Inventors: Santosh Ghosh, Portland, OR (US); Debayan Das, West Lafayette, IN (US); Carlos Tokunaga, Hillsboro, OR (US); Avinash L. Varna, Chandler, AZ (US); Joseph Friel, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 200 days.

(21) Appl. No.: 16/456,308

(22) Filed: Jun. 28, 2019

(65) Prior Publication Data

US 2019/0318130 A1 Oct. 17, 2019

(51) Int. Cl.
*G06F 21/72* (2013.01)
*G06F 21/12* (2013.01)
*G06F 21/64* (2013.01)

(52) U.S. Cl.
CPC ............ *G06F 21/72* (2013.01); *G06F 21/123* (2013.01); *G06F 21/64* (2013.01)

(58) Field of Classification Search
CPC ........ G06F 21/72; G06F 21/123; G06F 21/64; G06F 21/755; H04L 9/003; H04L 9/3247; H04L 9/0852; H04L 9/3242; G06N 3/08
See application file for complete search history.

(56) References Cited

U.S. PATENT DOCUMENTS 6,766,455 B1 * 7/2004 Ryan, Jr. ................. H04L 9/003 705/401
9,787,171 B2 10/2017 Fort
10,521,530 B2 * 12/2019 Levi .......................... G06F 1/10
10,572,619 B2 * 2/2020 Levi ...................... G06F 21/755
2007/0076890 A1 * 4/2007 Muresan ............... H04L 9/0625 380/287

(Continued)

FOREIGN PATENT DOCUMENTS

CN 112152776 A 12/2020
EP 1107502 A2 6/2001

(Continued)

OTHER PUBLICATIONS

Communication—Extended European Search Report for EP Application 20164851.6, dated Jul. 31, 2020, 9 pages.
Kar, Monodeep, et al., "Improved Power-Side—Channel-Attack Resistance of an AES-128 Core via a Security-Aware Integrated Buck Voltage Regulator", ISSCC 2017, Session 8, Digital PLLs and Security Circuits 8.1, Feb. 7, 2017, 3 pages.

(Continued)

*Primary Examiner* — Cheng-Feng Huang
(74) *Attorney, Agent, or Firm* — Jaffery Watson Mendonsa & Hamilton LLP

(57) ABSTRACT

Embodiments are directed to countermeasures against hardware side-channel attacks on cryptographic operations. An embodiment of an apparatus includes multiple crypto cores; and a current source including multiple current source blocks, the current source blocks including a respective current source block associated with each of the crypto cores, and wherein the current sources blocks are switchable to switch on a current source block associated with each active core of the multiple crypto cores and to switch off a current source associated with each inactive core of the multiple cryptographic cores.

16 Claims, 9 Drawing Sheets

Power Pin - VCC
Apparatus or System 300
Configurable Active SNR Reduction Circuit 320
330
Current SB-1
Current SB-2
Current SB-n
310
340
350
Capacitor Charge/Discharge
Bypass Path
Crypto Core-1
Crypto Core-2
Crypto Core-n
GND

(56) References Cited

U.S. PATENT DOCUMENTS

| | | | | |
|---|---|---|---|---|
| 2012/0331309 | A1* | 12/2012 | Scott | G06F 21/755<br>713/194 |
| 2015/0001938 | A1* | 1/2015 | Fort | G06F 21/755<br>307/52 |
| 2015/0268710 | A1* | 9/2015 | Bose | G06F 9/5094<br>713/300 |
| 2019/0303624 | A1* | 10/2019 | Moss | H04L 9/003 |
| 2019/0363877 | A1* | 11/2019 | Figueira | H04L 9/14 |

FOREIGN PATENT DOCUMENTS

| | | | |
|---|---|---|---|
| EP | 3758274 | A1 | 12/2020 |
| WO | 2004025444 | A2 | 3/2004 |
| WO | 2015094374 | A1 | 6/2015 |

OTHER PUBLICATIONS

Hwang, David D., et al., "AES-Based Security Coprocessor IC in 0.18-um CMOS With Resistance to Differential Power Analysis Side-Channel Attacks", IEEE Journal of Solid-State Circuits, vol. 41, No. 4, Apr. 2006, 11 pages.

Mangard, Stefan, "Hardware Countermeasures against DPA-A Statistical Analysis of Their Effectiveness", Institute for Applied Information Processing and Communications, Graz University of Technology, Inffeldgasse 16a, A-8010 Graz, Austria. T. Okamoto (Ed.): CT-RSA 2004, LNCS 2964, pp. 222-235, 2004. (c) Springer-Verlag Berlin Heidelberg 2004, 4 pgs.

Tokunaga, Carlos, et al., "Securing Encryption Systems With a Switched Capacitor Current Equalizer", IEEE Journal of Solid-State Circuits, vol. 45, No. 1, Jan. 2010, 9 pgs.

Ramsay, Craig & LoHuis, Jasper, "TEMPEST attacks against AES", Covertly stealing keys for €200, Whitepaper, 10 pages.

* cited by examiner

100

One-Time Hash-Based Signatures

A private key must only sign a single message

Multi -Time Hash-Based Signatures

150

A private key can sign multiple messages

200

WOTS One-Time Signature Scheme

Message is hashed and parsed into M:67 integers between [0,1,2,...15]

205 Public Key pk: 67 components of 32-bytes each

210 Signature s: 67 components of 32-bytes each

215 Public Key pk: 67 components of 32-bytes each

COUNTERMEASURES AGAINST HARDWARE SIDE-CHANNEL ATTACKS ON CRYPTOGRAPHIC OPERATIONS

TECHNICAL FIELD

Embodiments described herein generally relate to the field of electronic devices and, more particularly, countermeasures against hardware side-channel attacks on cryptographic operations.

BACKGROUND

Cryptography is implemented in computing systems to provide for secure data storage and communication, including security against side-channel attacks (SCAs). A side channel attack is an attack based on leaked information in a computing system, such as in the form of power consumption, electromagnetic emissions, or other signal observations from a circuit.

However, any security system utilizing cryptography is dependent upon the security inherent in the cryptography. This is becoming a more urgent concern as quantum computing is coming closer to reality. Quantum computing may be capable of breaking through systems that were previously believed to be highly secure, thus requiring Post-Quantum Cryptography solutions to prevent data losses in the face of the new challenges posed by quantum computer.

At the same time, new security solutions cannot impose such a great burden on computing system as to prevent effective operation. Thus, technology to prevent of side channel attacks needs to be lightweight as well as effective at reducing data leakage.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
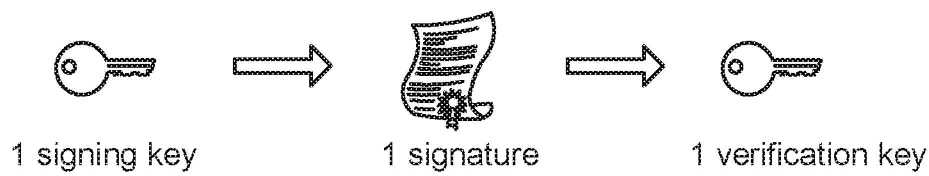
FIGS. 1A and 1B illustrate a one-time hash-based signatures scheme and a multi-time hash-based signatures scheme, respectively.

Embodiments described herein are directed to countermeasures against hardware side-channel attacks on cryptographic operations.

Hardware side-channel attacks like DPA (Differential Power Analysis) utilizing quantum computation have the potential for breaking mathematically secure cryptographic operations, such as AES-256 (Advanced Encryption Standard for 256 bits), within a minute. This poses a serious threat for products that use cryptographic hardware as building blocks, including Intel® AES-NI (Advanced Encryption Standard Instructions), SHA-NI (Secure Hash Algorithm), OCS/CSE, SDM (Secure Device Manager), DFX, MEE (Memory Encryption Engine), and MKTME (Multi-Key Total Memory Encryption). These cryptographic implementations are responsible for providing confidentiality, integrity and authenticity in critical platform features like Secure-boot, SGX (Software Guard Extensions), TDX (Trusted Domain Extensions), Secure-debug etc.

Traditional DPA protection technologies are algorithm specific (i.e., are not generic) and require at least 2× silicon-area and power overheads for implementation. Additionally, such technologies suffer from performance degradation (reduction in throughput) and are not scalable for different cryptographic modules existing in computer products.

Thus, what is required is a low-overhead, generic (i.e., not specific to a particular algorithm), and scalable countermeasure against differential Side-Channel Attacks (SCA) that utilize power, electromagnetic emissions, and other related observation methods.

In some embodiments, an apparatus, system, or process provides a generic, scalable differential SCA countermeasure that can be integrated with existing cryptography cores (crypto cores) without any change in the RTL (Resistor Transfer Level). In some embodiments, the technology requires negligible silicon-area (<5%) overhead compared to the Crypto Cores that do not include SCA protection. Further, the technology requires 50% lower power overhead compared to conventional SCA protection techniques.

In some embodiments, an apparatus, system, or process provides for a low-overhead countermeasure against hardware side-channel attacks on cryptographic operations, the countermeasure providing a generic solution that is applicable for varying algorithms. In some embodiments, countermeasure includes active SNR (Signal to Noise Ratio) reduction hardware to protect against a side channel attack that utilizes detection of power consumption, electromagnetic emissions, or other signal observations from a circuit. In some embodiments, the apparatus, system, or process includes a switchable current source for each of multiple crypto cores. In some embodiments, the apparatus, system, or process further includes use of a capacitive element to support current levels, and a bypass path to drain excess current and to maintain a reference voltage across the crypto cores.

Post-Quantum Cryptography

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Shor, P. W. "Algorithms for quantum computation: discrete logarithms and factoring". Proceedings 35th Annual Symposium on Foundations of Computer Science. IEEE Comput. Soc. Press. doi:10.1109/sfcs.1994.365700. ISBN 0818665807. Although any post-quantum cryptography could be built on the current cryptography, the novel approach would need to be intelligent, fast, and precise enough to resist and defeat any attacks by quantum computers.

Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's Hidden Field Equation (HFE) public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance, such as HBS.

Figure 1B:
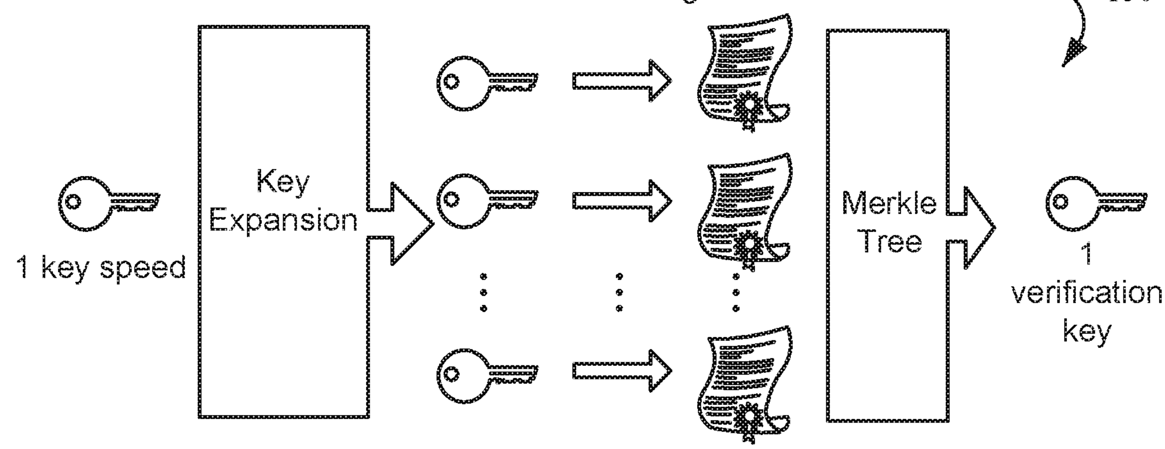

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), SPHINCS scheme, SPHINCS+ scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessary basic ingredients, such as relying on symmetric cryptography building blocks (e.g., hash functions), to counter the quantum counting and post-quantum computing challenges. HBS schemes are regarded as fast signature algorithms working with fast platform secured-boot, which is regarded as the most resistant to quantum attacks.

For example, as illustrated with respect to FIG. 1A, a scheme of HBS is shown that uses Merkle trees along with one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
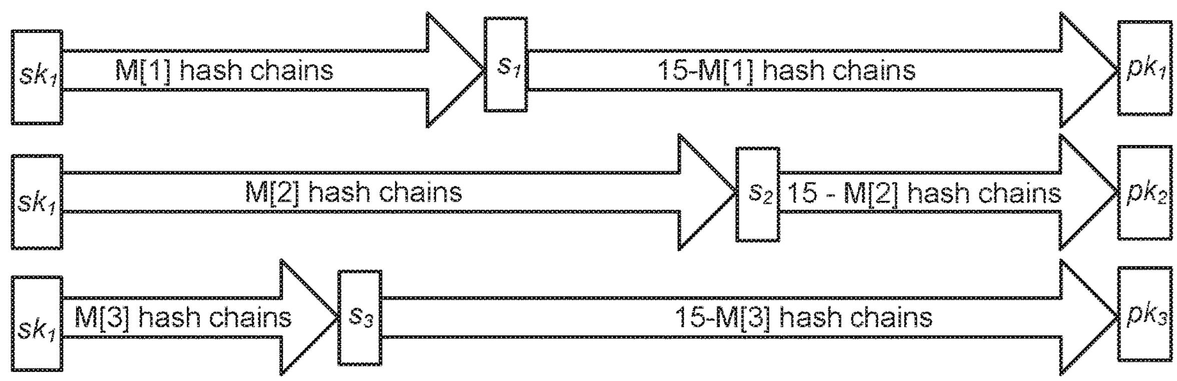
FIGS. 2A and 2B illustrate a one-time signature scheme and a multi-time signature scheme, respectively.
Figure 2A:
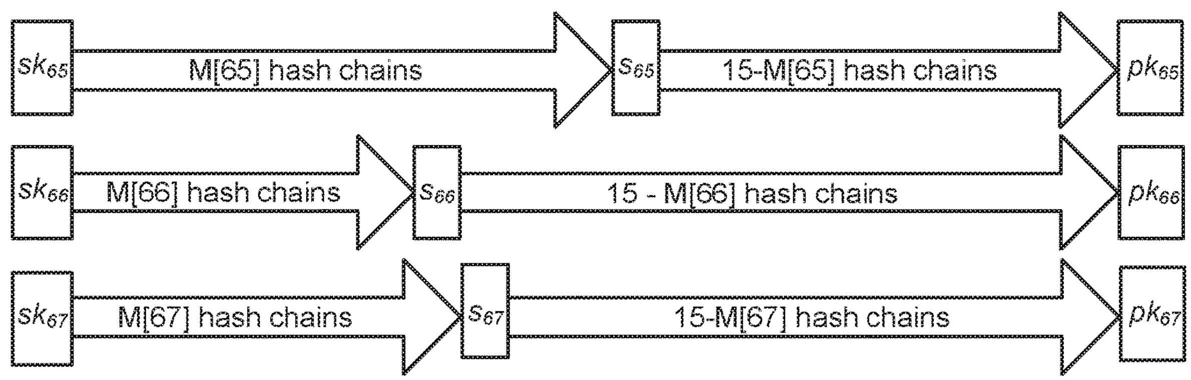
Figure 2B:
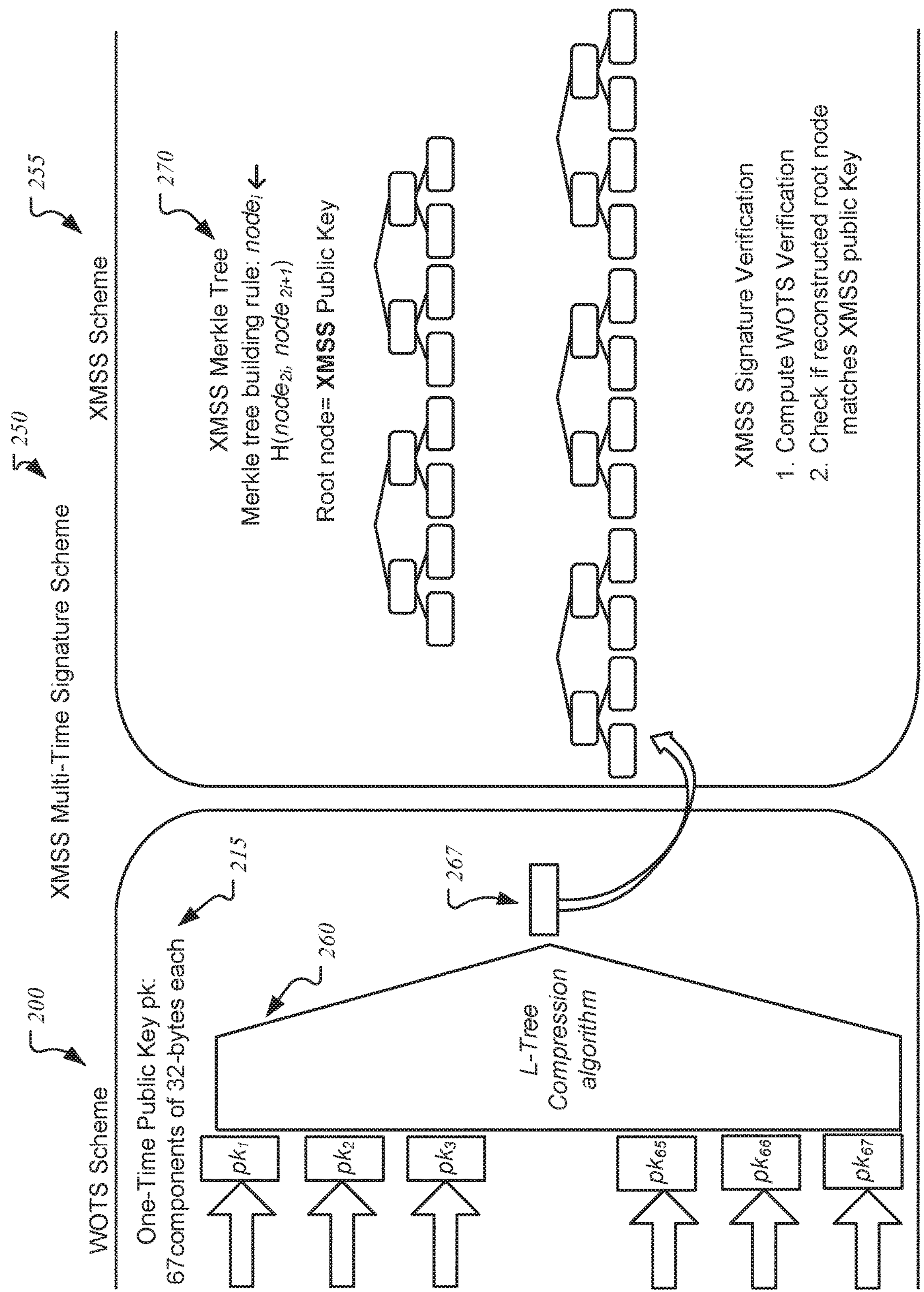

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS (WOTS) scheme 200, which was offered by Robert Winternitz of Stanford Mathematics Department, while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

Now, for example, FIG. 2B illustrates XMSS MTS scheme 250 that allows for a combination of WOTS scheme 200 of FIG. 2A and XMSS scheme 255 having XMSS Merkle tree 270. As discussed previously with respect to FIG. 2A, WOTS scheme 200 is based on a one-time public key, pk, 215, having 67 components of 32 bytes each, that is then put through L-Tree compression algorithm 260 to offer WOTS compressed pk 267 to take a place in the XMSS Merkle tree 270 of XMSS scheme 255. It is contemplated that XMSS signature verification may include computing WOTS verification and checking to determine whether a reconstructed root node matches the XMSS public key, such as root node=XMSS public key.

Countermeasures Against Hardware Side-Channel Attacks

Figure 3:
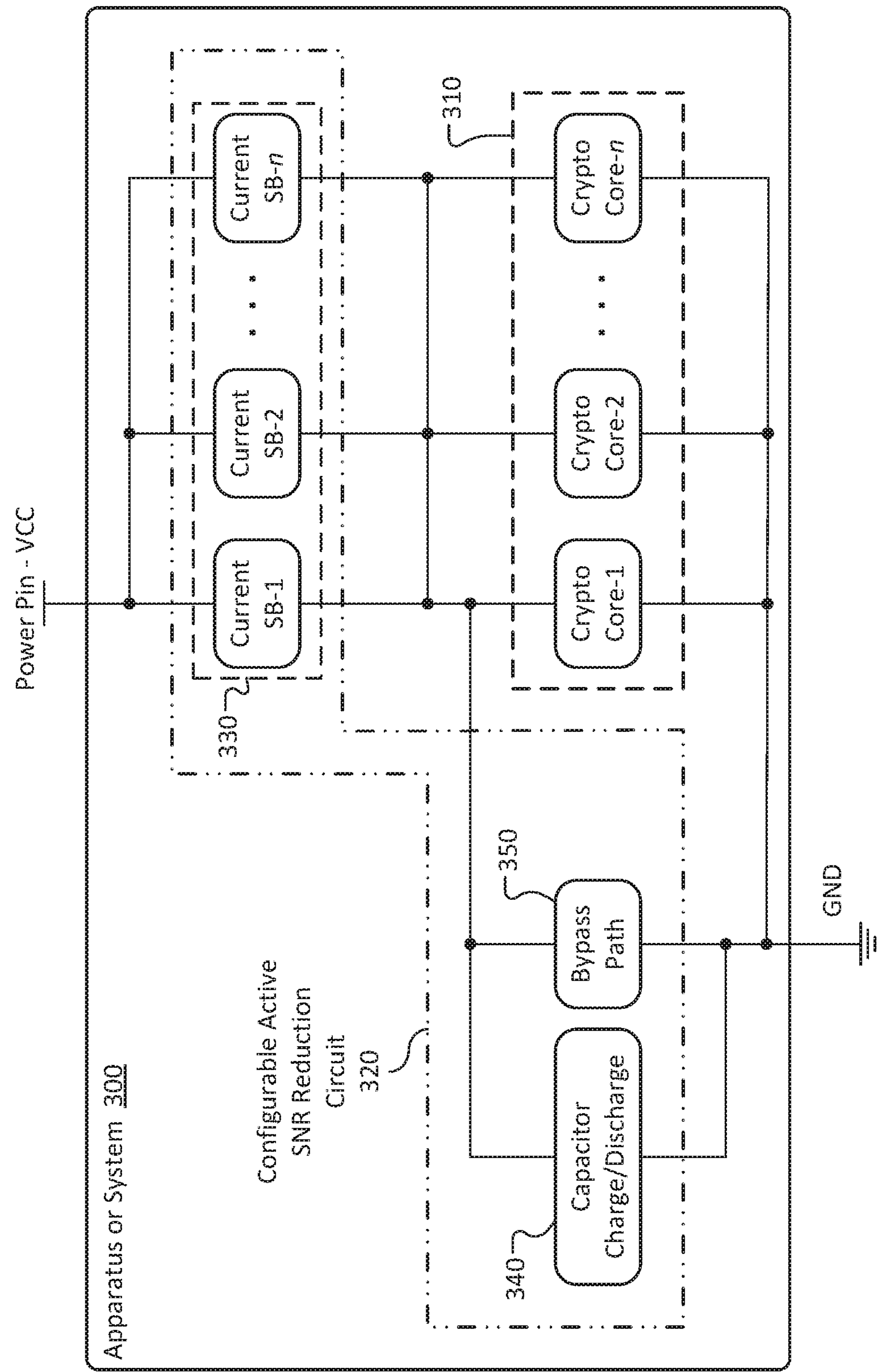
FIG. 3 illustrates an apparatus or system to provide protection against side-channel attacks through active reduction in a signal-to-noise ratio according to some embodiments.

FIG. 3 illustrates an apparatus or system to provide protection against side-channel attacks through active reduction in a signal-to-noise ratio according to some embodiments. FIG. 3 depicts a high level view of an apparatus or system 300 including a configurable active SNR (signal-to-noise ratio) reduction circuit 320 to provide a low-overhead SCA countermeasure, the countermeasure providing a generic solution that is applicable for varying algorithms. In some embodiments, the apparatus or system provides for active reduction of detectable signals from multiple crypto cores, wherein the circuit is responsive to activity of each such crypto core.

As illustrated in FIG. 3, the apparatus or system 300 includes multiple crypto cores 310, the crypto cores 310 being illustrated as Crypto Core-1, Crypto Core-2, and continuing through Crypto Core-n. In some embodiments, the active SNR reduction circuit includes hardware components that are integrated between a power supply pin (VCC) and ground pin (GND) for the crypto cores 310, the components including a current source 330, a capacitor (or multiple capacitors) 340, and a bypass path 350. The current source 330 may include a respective current source block that is associated with each of the crypto cores 310, such as Current Source Block-1 (Current SB-1) associated with Crypto Core-1, Current Source Block-2 associated with Crypto Core-2, and continuing through Current Source Block-n associated with Crypto Core-n.

In some embodiments, the current sources 330 are to operate in saturation mode and ensure that variations in the current flow observed from the VCC pin is largely independent of crypto executions by the crypto cores 310. In a system or apparatus 300 integrated into an integrated circuit (IC), an attacker may be limited to only accessing the power supply pin (VCC) from a periphery of the IC, which is isolated from the crypto cores 310. In some embodiments, the bypass path 350 is to drain out excess current and to maintain a voltage across the crypto cores 310 to a desired reference voltage such that any variations of in current flow that is visible at VCC is suppressed. As the current sources 330 provide fixed currents, the capacitor 340 is to absorb (charge) and provide (discharge) extra current based on executions in the Crypto Cores through charge and discharge operation.

In some embodiments, the complete apparatus or system 300 may be implemented in, for example, the 10 nm P1274.7 technology of Intel Corporation, to provide a peak-to-peak current signal suppression of 350× from a SHA-3 crypto engine. In this example, this means that the hardware can provide $(350)^2$x protection against differential power, electromagnetic radiation, and related side-channel attacks because the number of traces to break the secret key increases proportionally with $(SNR)^2$.

Figure 4:
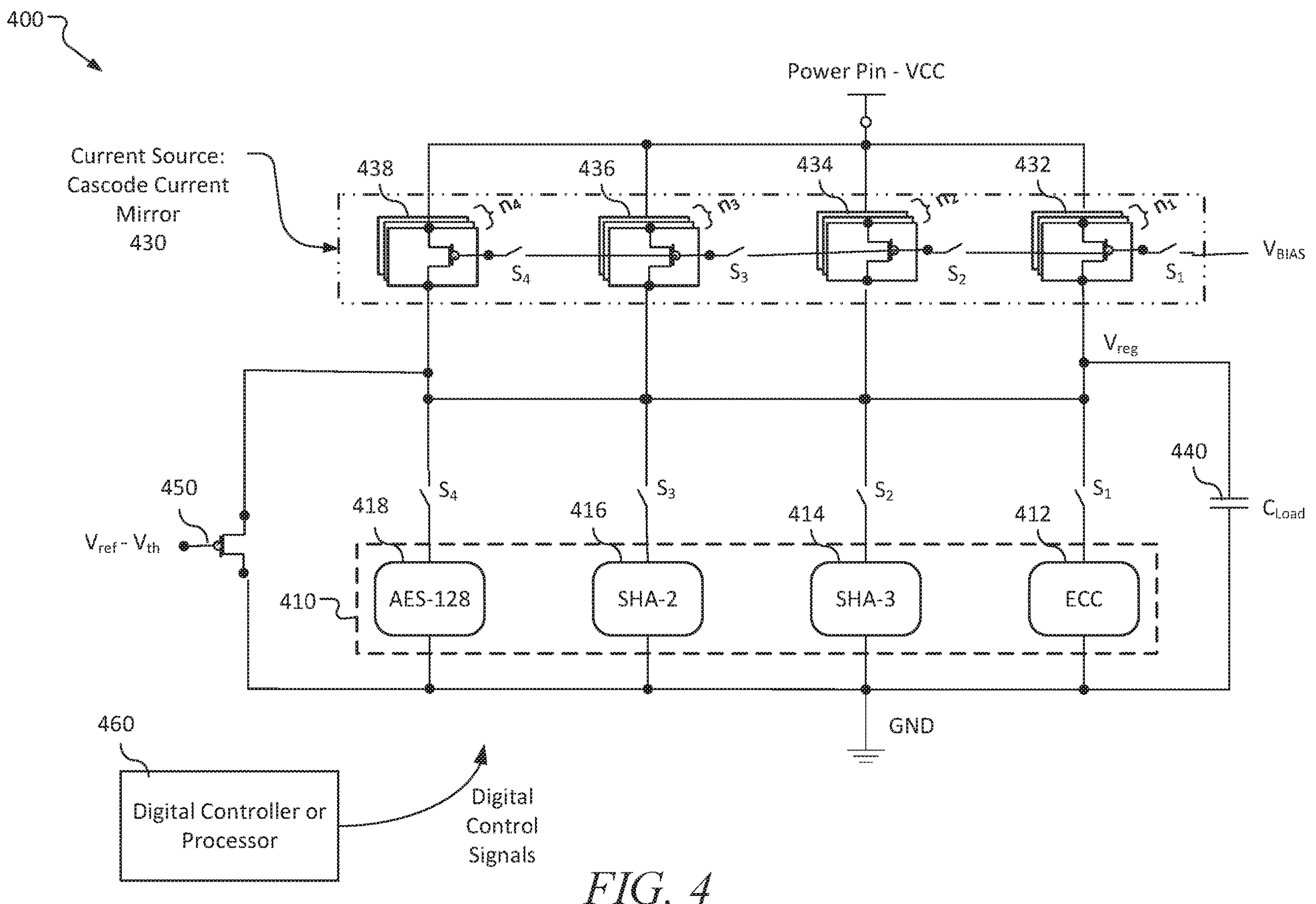
FIG. 4 illustrates circuitry to provide side-channel attack protection for crypto cores according to some embodiments.

FIG. 4 illustrates circuitry to provide side-channel attack protection for crypto cores according to some embodiments. FIG. 4 depicts an implementation and circuit diagram for active SNR reduction hardware that provides SCA protection for multiple differing crypto cores. In some embodiments, a circuit 400 includes the multiple crypto cores in a crypto block 410, wherein the crypto cores may include, but are not limited to, an ECC (Error Correction Code) core 412, a SHA-3 core 414, a SHA-2 core 416, and an AES-128 core 418. As shown, the circuit 400 includes a power pin (VCC) and a ground (GND). The circuit may, for example, be isolated in an IC, thus reducing outside access to power measurements or other side channel attack targets.

In some embodiments, the circuit includes a current source 430, such as a cascode current mirror circuit. In some embodiments, the current source includes an individual current source block that is associated with each of the crypto cores in the crypto block 410, illustrated as current source block 432 associated with ECC core 412, current source block 434 associated with SHA-3 core 414, current source block 436 associated with SHA-2 core 416, and current source block 438 associated with AES-128 core 418.

In some embodiments, the current level is tuned for the current requirements of each crypto core by implementation of a block containing a certain number of PMOS (P-Type Metal-Oxide Semiconductor) slices (also referred to as current source sub-circuits, or simply sub-circuits, herein) for each current source block, which is illustrated as current source block 432 including a block of $n_1$ PMOS slices, current source block 434 including a block of $n_2$ PMOS slices, current source block 436 including a block of $n_3$ PMOS slices, and current source block 438 including a block of $n_4$ PMOS slices. The current source 430 is to run at saturation, as described above for current sources 330 in FIG. 3. In order to run the current source 430 in saturation, a bias voltage ($V_{BIAS}$) is provided to each of the current source blocks 432-438. Further, the circuit 400 includes a capacitor ($C_{LOAD}$) 440 across the crypto cores 410, wherein the capacitor 440 is to provide extra current to the crypto block 410 when the crypto cores require more than the average current that is provided by the current source 430.

It is further noted that the circuit 400 may have a quantization effect causing the voltage $V_{reg}$ to increase gradually. To address this effect, the circuit 400 further includes a bypass path (which may include, for example, a PMOS transistor 450, biased at a reference voltage ($V_{ref}$) minus the threshold voltage ($V_{TH}$) for the transistor device)), which provides a negative bias and assists in maintaining the current source 430 at saturation.

The circuit 400 is scalable based on the number of crypto cores and amount of load current for each of the crypto cores. The supply current at $V_{reg}$ may regulated by turning on or off one or more blocks of sub-circuits ($n_1$, $n_2$, $n_3$, $n_4$) using digital control signals from a digital controller or processor 460, whenever any of the crypto cores 412-418 is turned on or off. In some embodiments, the switching may be performed by switching a respective switch between $V_{reg}$ and each of the crypto cores, such as switch $S_1$ coupled with ECC core 412, switch $S_2$ coupled with SHA-3 core 414, switch $S_3$ coupled with SHA-2 core 416, and switch $S_4$ coupled with AES-128 core 418, and switching off the $V_{BIAS}$ voltage to the associated current using a respective switch between $V_{BIAS}$ and the current source, such as switch $S_1$ coupled with current source block 432, switch $S_2$ coupled with current source block 434, switch $S_3$ coupled with current source block 436, and switch $S_4$ coupled with current source block 438. For simplicity of illustration, the controls between the switches and the digital controller are not shown. Further, it is noted that there is an electrical connection between the $V_{BIAS}$ voltage and each current source switch that is not specifically illustrated in FIG. 4. The operation of the digital control is further described below in connection with FIG. 5.

Figure 5:
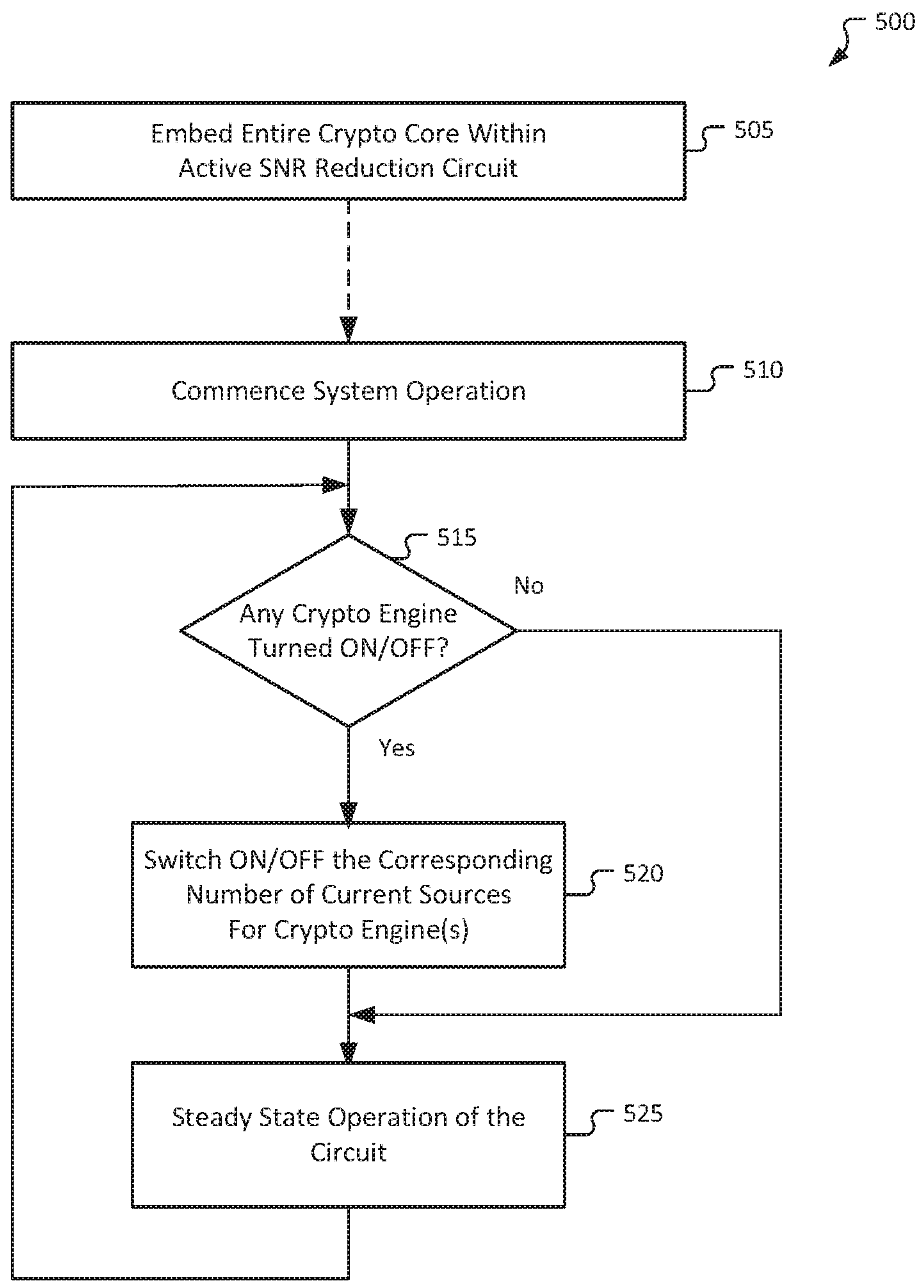
FIG. 5 is a flow chart to illustrate execution flow in an active SNR reduction apparatus or system with multiple crypto cores, according to some embodiments.

In some embodiments, the digital controller or processor 460 turns on the respective switches to regulate the node voltage across the appropriate crypto core whenever a new crypto instruction comes. Similarly, it turns off the respective switches after the end of the execution. FIG. 5, described below, illustrates an execution flow to handle different load currents based on the total current consumption of the crypto cores. Depending on the number of crypto cores operating at a given time, the corresponding number of current sources are turned on. For example, when the AES-128 block operates, the switch $S_4$ closes and the corresponding current source block with $n_4$ PMOS slices is gated (turned on). Similarly, when both AES-128 and SHA-3 engines operate at a same or overlapping time, switches $S_4$ and $S_2$ close, thereby regulating the supply current and thus maintaining the voltage across the crypto cores at $V_{reg}$. The number of current sources ($n_1$, $n_2$, $n_3$, $n_4$) for each crypto core depends on its average current consumption for the respective core, which is estimated in design time.

The current source in the circuit 400 provides an almost constant current such that any fluctuation during cryptographic operations is highly suppressed. The current source is realized using a cascode current mirror, properly biased to provide high output impedance (~1-10 KΩ). In a particular implementation, an attacker from the periphery of the SoC can only access the power pin, which is now isolated from power supply (Vreg) of the crypto cores.

In steady-state operation of the system, the bypass path is biased in saturation (near-threshold operation with bias voltage=$V_{ref}$–$V_{th}$), which ensures that the voltage across the crypto core is regulated. This also assists in operating the current source in saturation, providing high signature suppression and significant SNR reduction. The bypass path may be implemented in multiple different ways, including a PMOS transistor 450 (as illustrated in FIG. 4), NMOS (N-Type Metal-Oxide Semiconductor) transistor, or Op-amp (Operational Amplifier) based techniques.

FIG. 5 is a flow chart to illustrate execution flow in an active SNR reduction apparatus or system with multiple crypto cores, according to some embodiments. In some embodiments, an entire crypto core block containing the multiple crypto cores is embedded within or together with an active SNR reduction circuit 505, such as illustrated in FIGS. 3 and 4. In some embodiments, the circuit is designed to provide appropriate average current for each crypto core of the crypto core block.

Upon commencement of operation of the apparatus or system 510, a particular crypto engine (i.e., a crypto core) of the multiple crypto engines is activated by switching the respective switches associated with the crypto engine on whenever a new crypto instruction arrives. In some embodiments, the switches may be activated by receipt of a digital control signal from a controller or processor. Similarly, the respective switches associated with the crypto engine are switched off after end of the execution. As illustrated in FIG. 5, upon any crypto engine being turned on or off 515, the corresponding number of current sources are switched on or off 520, then continuing with the steady state operation of the circuit 525.

FIG. 5 illustrates the execution flow to handle different load currents based on the total current consumption of the crypto cores. Depending on the number of crypto cores operating at a given time, the corresponding number of current sources are turned on. For example, when the AES-128 block 418 operates, the switch $S_4$ closes (referring to FIG. 4) and the corresponding current source block 438 with $n_4$ PMOS slices is gated (turned on). Similarly, when both AES-128 and SHA-3 engines operate together, switches $S_4$ and $S_2$ close, thereby regulating the supply current and thus maintaining the voltage across the crypto cores at $V_{reg}$. The number of current sources ($n_1$, $n_2$, $n_3$, $n_4$) for each crypto core depends on its average current consumption, which is estimated in design time for the circuit.

Figure 6A:
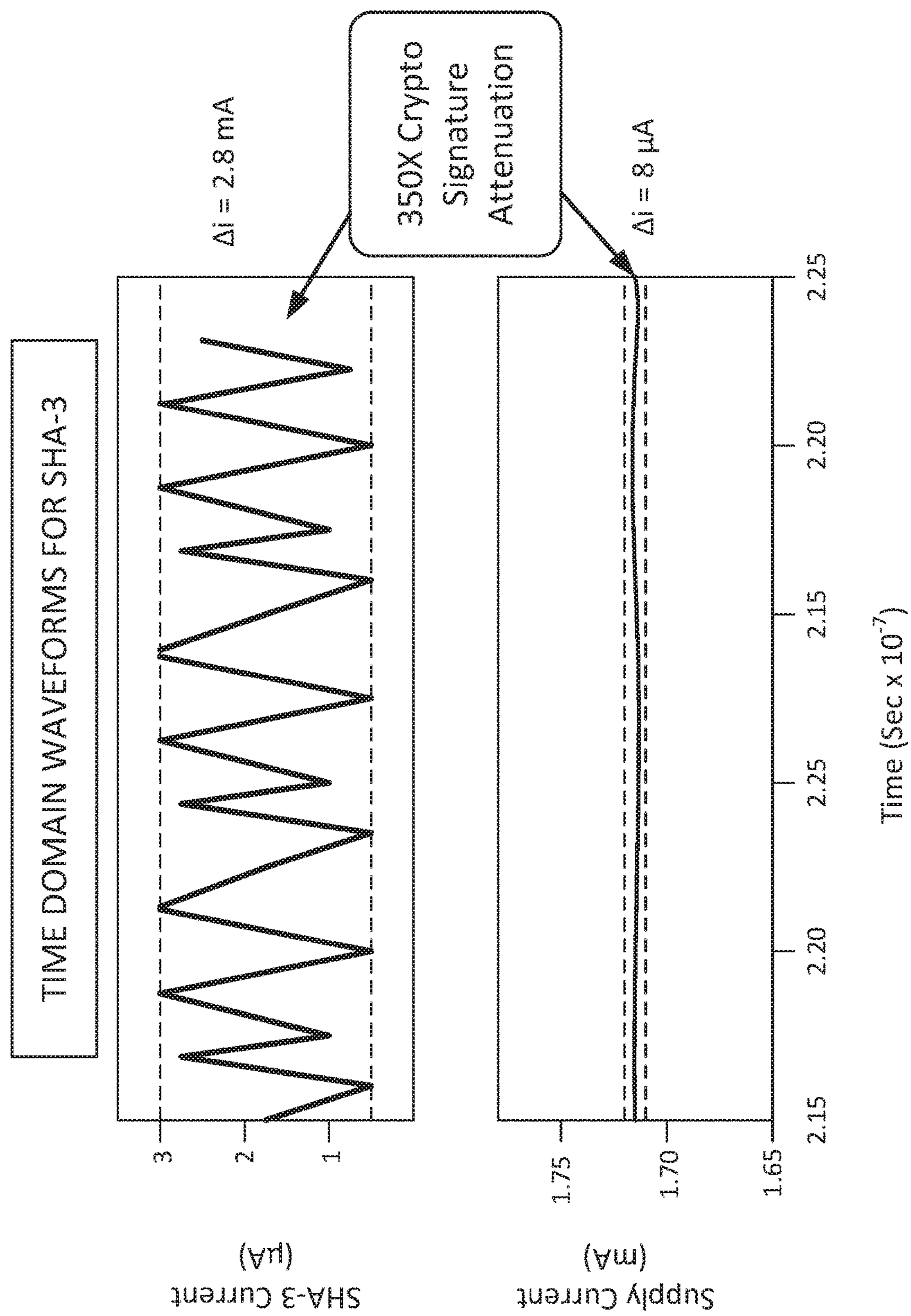
FIG. 6A illustrates time-domain waveforms for a crypto core comparing crypto core current to supply current in an embodiment.

FIG. 6A illustrates time-domain waveforms for a crypto core comparing crypto core current to supply current in an embodiment. FIG. 6A specifically illustrates waveforms for a SHA-3 hardware engine (as an example crypto core), the SHA-3 hardware engine being a current load for active SNR reduction hardware such as illustrated in FIGS. 3 and 4.

As shown in FIG. 6A, the variations reflected at the supply current in this example are highly attenuated (from $\Delta i$=2.8 mA reduced to $\Delta i$=2.8 μA, or 350× reduction). FIG. 6A provides a snapshot of a time-domain waveform for an embodiment including active SNR reduction hardware (such as illustrated in FIGS. 3 and 4) on a SHA-3 engine, designed in Intel's 10 nm (p1274) technology.

Figure 6B:
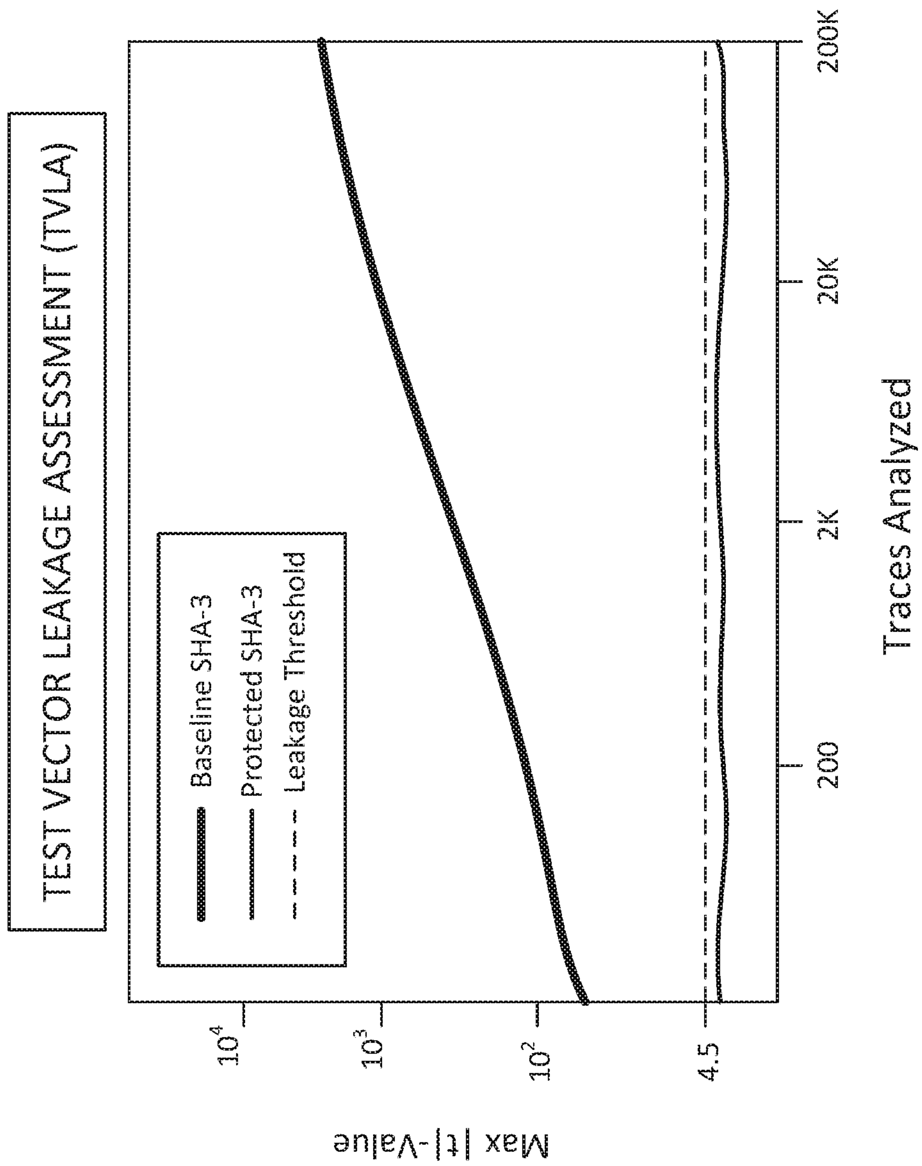
FIG. 6B illustrates the Test Vector Leakage Assessment (TVLA) for a crypto core in an embodiment.

FIG. 6B illustrates the Test Vector Leakage Assessment (TVLA) for a crypto core in an embodiment. FIG. 6B provides a comparison of TVLA for baseline SHA3 hardware and active SNR reduction hardware in an embodiment. It can be seen in FIG. 6B that the baseline SHA-3 implementation shows significant amount of information leakage (t-value of ~2000 for 200 K traces), while the t-value with in an embodiment of an active SNR reduction circuit remains below the commonly used threshold of 4.5 for statistically significant leakage at 200 K traces.

Thus, as shown in FIGS. 6A and 6B, protection is significantly enhanced (by a factor of 350× in this example) with a power overhead of 1.6× as measured compared to the baseline SHA-3 implementation. Further, the area overhead of the rest of the SNR reduction circuit hardware may be less than 5% of the SHA-3 silicon area. In some embodiments, a load capacitor of 100 pF can be implemented in the metal stack using a MOM/MIM (Metal-Insulator-Metal/Metal-Oxide-Metal) capacitor to avoid additional silicon area.

Thus, an embodiment of a SCA countermeasure circuit including an active SNR reduction circuit may be implemented with very low power and area overheads, and further is generic and flexible for protecting any crypto engines against power and EM side-channel attacks. Additionally, the SCA countermeasure can be applied to the existing crypto hardware implementations without any RTL (Resistor Transfer Level) change, and without affecting performance of the crypto operation of the circuit.

Figure 7:
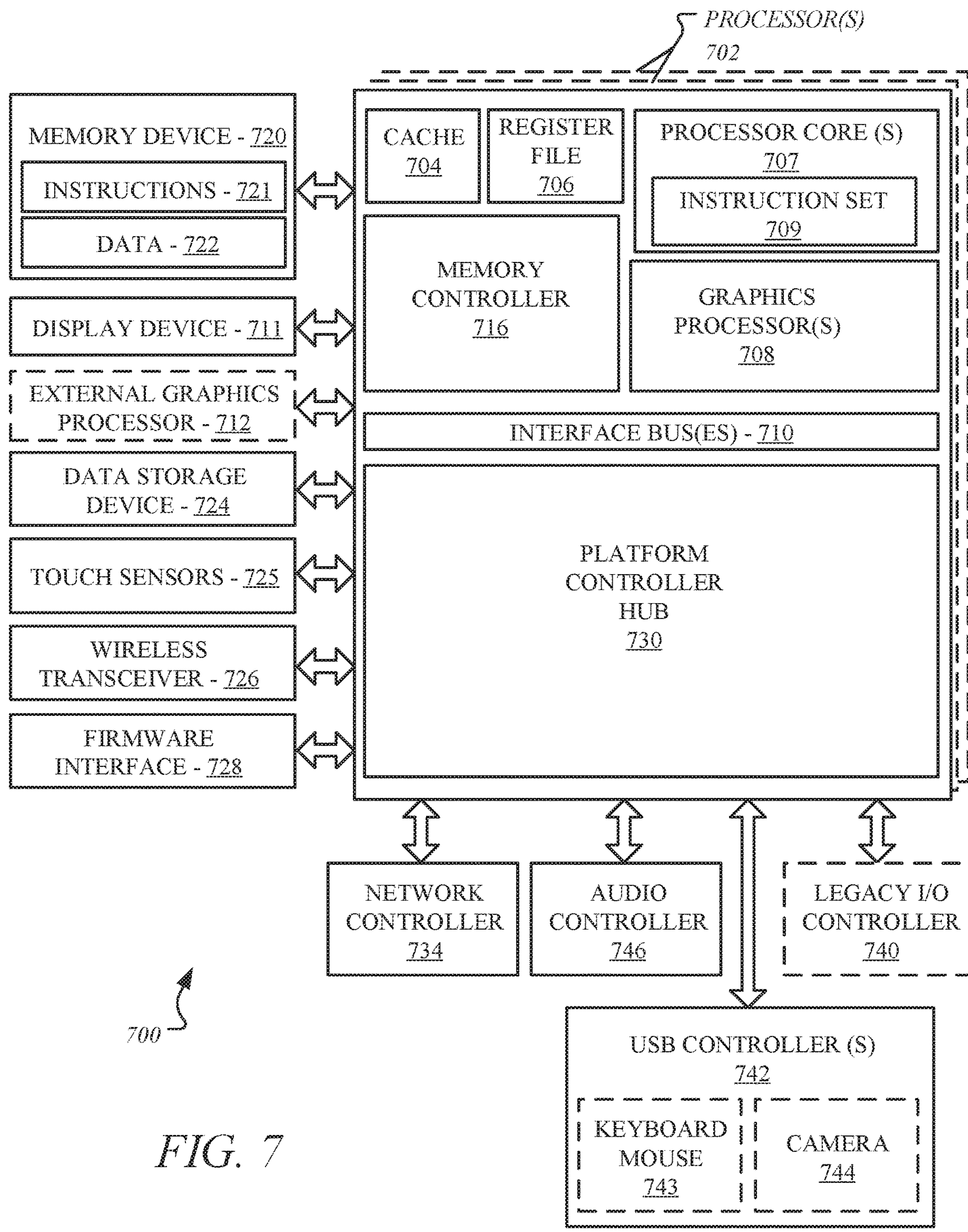
FIG. 7 illustrates a schematic illustration of a computing architecture which may be adapted to implement adversarial training of neural networks using information about activation path differentials in accordance with some examples.

FIG. 7 illustrates an embodiment of an exemplary computing architecture that may be suitable for implementing various embodiments as previously described. In various embodiments, the computing architecture 700 may comprise or be implemented as part of an electronic device. In some embodiments, the computing architecture 700 may be representative, for example, of a computer system that implements one or more components of the operating environments described above. In some embodiments, computing architecture 700 may be representative of one or more portions or components of a Deep Neural Network (DNN) training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In some embodiments, an apparatus includes a plurality of crypto cores; and a current source including a plurality of current source blocks, the plurality of current source blocks including a respective current source block associated with each of the plurality of crypto cores; wherein the plurality of current sources blocks are switchable to switch on a current source block associated with each active core of the plurality of crypto cores and to switch off a current source associated with each inactive core of the plurality of crypto cores.

In some embodiments, the apparatus further includes a plurality of switches, wherein the plurality of switches includes a respective switch associated with each of the plurality of crypto cores and a respective switch associated with each of the plurality of current source blocks.

In some embodiments, the plurality of switches are controlled by digital control signals.

In some embodiments, the apparatus further includes a capacitor, the capacitor being connected across the plurality of crypto cores.

In some embodiments, the apparatus further includes a bypass path, the bypass path being connected across the plurality of crypto cores.

In some embodiments, the bypass path includes one of a PMOS (P-Type Metal-Oxide Semiconductor) transistor, an NMOS (N-Type Metal-Oxide Semiconductor) transistor, or Op-amp (Operational Amplifier) based techniques.

In some embodiments, each current source block of the current source includes one or more current source slices.

In some embodiments, a number of current source slices for each current source block is determined based on an average current consumption for a crypto core associated with the current source block.

In some embodiments, the apparatus is an IC, the IC including a power pin that is coupled with the current source.

In some embodiments, power connections to the crypto cores are isolated within the IC.

In some embodiments, a system includes one or more processors; a memory for storage of data; a crypto block including a plurality of crypto cores; and an active SNR (Signal to Noise Ratio) reduction circuit coupled with the crypto block, the active SNR reduction circuit including a current source including a plurality of current source blocks, the plurality of current source blocks including a respective current source block associated with each of the plurality of crypto cores; and wherein the plurality of current source blocks are switchable to switch on a current source block associated with each active core of the plurality of crypto cores and to switch off a current source associated with each inactive core of the plurality of crypto cores.

In some embodiments, the active SNR reduction circuit further includes a plurality of switches, wherein the plurality of switches includes a respective switch associated with each of the plurality of crypto cores and a respective switch associated with each of the plurality of current source blocks.

In some embodiments, the plurality of switches are controlled by digital control signals.

In some embodiments, the active SNR reduction circuit further includes a capacitor, the capacitor being connected across the plurality of crypto cores.

In some embodiments, the active SNR reduction circuit further includes a bypass path, the bypass path being connected across the plurality of crypto cores.

In some embodiments, the bypass path includes one of a PMOS (P-Type Metal-Oxide Semiconductor) transistor, an NMOS (N-Type Metal-Oxide Semiconductor) transistor, or Op-amp (Operational Amplifier) based techniques.

In some embodiments, each current source block of the current source includes one or more current source slices.

In some embodiments, a number of current source slices for each current source block is determined based on an average current consumption for a crypto core associated with the current source block.

In some embodiments, the system further includes an integrated circuit (IC), the integrated circuit including the active SNR reduction circuit and the crypto block.

In some embodiments, the IC includes a power pin that is coupled with the current source, and wherein power connections to the crypto block are isolated within the IC.

In some embodiments, one or more non-transitory computer-readable storage mediums having stored thereon executable computer program instructions that, when executed by one or more processors, cause the one or more processors to perform operations including commencing operation of a system, the system including a crypto block including a plurality of crypto cores and an active SNR (Signal to Noise Ratio) reduction circuit coupled with the crypto block; and upon determining that a first crypto core of the plurality of crypto cores is to be turned on or off, switching a first current source block of a plurality of current source blocks of the active SNR reduction circuit, the first current source block to be switched on if the first crypto core is to be turned on and the first current source block to be switched off if the first crypto core is to be turned off.

In some embodiments, the active SNR reduction circuit further includes a plurality of switches, and wherein switching the first current source block on or off includes switching a respective switch of the plurality of switches associated with the first crypto core and switching a respective switch of the plurality of switches associated with the first current source block.

In some embodiments, the active SNR reduction circuit further includes a capacitor, the capacitor being connected across the plurality of crypto cores.

In some embodiments, the active SNR reduction circuit further includes a bypass path, the bypass path being connected across the plurality of crypto cores.

In some embodiments, a method includes commencing operation of a system, the system including a crypto block including a plurality of crypto cores and an active SNR (Signal to Noise Ratio) reduction circuit coupled with the crypto block; and upon determining that a first crypto core of the plurality of crypto cores is to be turned on or off, switching a first current source block of a plurality of current source blocks of the active SNR reduction circuit, the first current source block to be switched on if the first crypto core is to be turned on and the first current source block to be switched off if the first crypto core is to be turned off.

In some embodiments, the active SNR reduction circuit further includes a plurality of switches, and wherein switching the first current source block on or off includes switching a respective switch of the plurality of switches associated with the first crypto core and switching a respective switch of the plurality of switches associated with the first current source block.

In some embodiments, the active SNR reduction circuit further includes a capacitor, the capacitor being connected across the plurality of crypto cores.

In some embodiments, the active SNR reduction circuit further includes a bypass path, the bypass path being connected across the plurality of crypto cores.

In some embodiments, an apparatus includes means for commencing operation of a system, the system including a crypto block including a plurality of crypto cores and an active SNR (Signal to Noise Ratio) reduction circuit coupled with the crypto block; and means for switching a first current source block of a plurality of current source blocks of the active SNR reduction circuit upon determining that a first crypto core of the plurality of crypto cores is to be turned on or off, the first current source block to be switched on if the first crypto core is to be turned on and the first current source block to be switched off if the first crypto core is to be turned off.

In some embodiments, the active SNR reduction circuit further includes a plurality of switches, and wherein switching the first current source block on or off includes switching a respective switch of the plurality of switches associated with the first crypto core and switching a respective switch of the plurality of switches associated with the first current source block.

In some embodiments, the active SNR reduction circuit further includes a capacitor, the capacitor being connected across the plurality of crypto cores.

In some embodiments, the active SNR reduction circuit further includes a bypass path, the bypass path being connected across the plurality of crypto cores.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:

a plurality of crypto cores;

a current source including a plurality of current source blocks, the plurality of current source blocks including a respective current source block associated with each of the plurality of crypto cores;

a plurality of switches, wherein the plurality of switches includes a respective switch associated with each of the plurality of crypto cores and a respective switch associated with each of the plurality of current source blocks;

a capacitor, the capacitor being connected across the plurality of crypto cores; and a bypass path, the bypass path being connected across the plurality of crypto cores;

wherein the plurality of current sources blocks are switchable to switch on a current source block associated with each active core of the plurality of crypto cores and to switch off a current source block associated with each inactive core of the plurality of crypto cores.

2. The apparatus of claim 1, wherein the plurality of switches are controlled by digital control signals.

3. The apparatus of claim 1, wherein the bypass path includes one of a PMOS (P-Type Metal-Oxide Semiconductor) transistor, an NMOS (N-Type Metal-Oxide Semiconductor) transistor, or Op-amp (Operational Amplifier) based techniques.

4. The apparatus of claim 1, wherein each current source block of the current source includes one or more current source slices.

5. The apparatus of claim 4, wherein a number of current source slices for each current source block is determined based on an average current consumption for a crypto core associated with the current source block.

6. The apparatus of claim 1, wherein the apparatus is an integrated circuit (IC), the IC including a power pin that is coupled with the current source.

7. The apparatus of claim 6, wherein power connections to the crypto cores are isolated within the IC.

8. A system comprising:

one or more processors;

a memory for storage of data;

a crypto block including a plurality of crypto cores; and an active SNR (Signal to Noise Ratio) reduction circuit coupled with the crypto block, the active SNR reduction circuit including:

a current source including a plurality of current source blocks, the plurality of current source blocks including a respective current source block associated with each of the plurality of crypto cores;

a plurality of switches, wherein the plurality of switches includes a respective switch associated with each of the plurality of crypto cores and a respective switch associated with each of the plurality of current source blocks;

a capacitor, the capacitor being connected across the plurality of crypto cores; and a bypass path, the bypass path being connected across the plurality of crypto cores; and wherein the plurality of current source blocks are switchable to switch on a current source block associated with each active core of the plurality of crypto cores and to switch off a current source block associated with each inactive core of the plurality of crypto cores.

9. The system of claim 8, wherein the plurality of switches are controlled by digital control signals.

10. The system of claim 8, wherein the bypass path includes one of a PMOS (P-Type Metal-Oxide Semiconductor) transistor, an NMOS (N-Type Metal-Oxide Semiconductor) transistor, or Op-amp (Operational Amplifier) based techniques.

11. The system of claim 8, wherein each current source block of the current source includes one or more current source slices.

12. The system of claim 11, wherein a number of current source slices for each current source block is determined based on an average current consumption for a crypto core associated with the current source block.

13. The system of claim 8, further comprising an integrated circuit (IC), the integrated circuit including the active SNR reduction circuit and the crypto block.

14. The system of claim 13, wherein the IC includes a power pin that is coupled with the current source, and wherein power connections to the crypto block are isolated within the IC.

15. One or more non-transitory computer-readable storage mediums having stored thereon executable computer program instructions that, when executed by one or more processors, cause the one or more processors to perform operations comprising:

commencing operation of a system, the system including a crypto block including a plurality of crypto cores and an active SNR (Signal to Noise Ratio) reduction circuit coupled with the crypto block; and upon determining that a first crypto core of the plurality of crypto cores is to be turned on or off, switching a first current source block of a plurality of current source blocks of the active SNR reduction circuit, the first current source block to be switched on if the first crypto core is to be turned on and the first current source block to be switched off if the first crypto core is to be turned off; and wherein the active SNR reduction circuit further includes:

a plurality of switches, the plurality of switches including a respective switch associated with each of the plurality of crypto cores and a respective switch associated with each of the plurality of current source blocks;

a capacitor, the capacitor being connected across the plurality of crypto cores; and a bypass path, the bypass path being connected across the plurality of crypto cores.

16. The one or more storage mediums of claim 15, wherein switching the first current source block on or off includes switching a respective switch of the plurality of switches associated with the first crypto core and switching a respective switch of the plurality of switches associated with the first current source block.

* * * * *